(12) United States Patent
Chandrakeerthy

(10) Patent No.: US 9,873,405 B2
(45) Date of Patent: Jan. 23, 2018

(54) SEAT BELT TWIST LINK

(71) Applicant: Zodiac Seats US LLC, Gainesville, TX (US)

(72) Inventor: Sanmathi Bangalore Chandrakeerthy, Bangalore (IN)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/510,309

(22) PCT Filed: Sep. 10, 2015

(86) PCT No.: PCT/US2015/049382
§ 371 (c)(1),
(2) Date: Mar. 10, 2017

(87) PCT Pub. No.: WO2016/040600
PCT Pub. Date: Mar. 17, 2016

(65) Prior Publication Data
US 2017/0305385 A1 Oct. 26, 2017

Related U.S. Application Data

(60) Provisional application No. 62/048,431, filed on Sep. 10, 2014.

(51) Int. Cl.
B60R 22/26 (2006.01)
F16G 11/00 (2006.01)

(52) U.S. Cl.
CPC ............. B60R 22/26 (2013.01); F16G 11/00 (2013.01); B60R 2022/263 (2013.01); B60R 2022/266 (2013.01)

(58) Field of Classification Search
None
See application file for complete search history.

(56) References Cited

U.S. PATENT DOCUMENTS 3,981,052 A * 9/1976 Pilarski .................. A44B 11/12
24/163 R
3,994,513 A * 11/1976 Courtis ................... B60R 22/18
280/808

(Continued)

FOREIGN PATENT DOCUMENTS

DE 3115726 10/1982
FR 2211902 7/1974

(Continued)

OTHER PUBLICATIONS

International Patent Application No. PCT/US2015/049382, Search Report and Written Opinion, dated Nov. 11, 2015.

Primary Examiner — Paul N Dickson
Assistant Examiner — Timothy Wilhelm
(74) Attorney, Agent, or Firm — Kilpatrick Townsend & Stockton LLP; Dean W. Russell; Tiffany L. Williams

(57) ABSTRACT

Described are seat belt connection assemblies having a seat belt twist link integrally formed as a single piece construction having a mounting portion and a linking portion connected by a twist portion. A plane of the mounting portion is positioned at approximately a right angle to a plane of the linking portion. The linking portion has a planar section and a curled section, and a slot that extends through at least some of the planar section and the curled section. The curled section of the linking portion has a pronged end that extends along sides of the slot.

12 Claims, 4 Drawing Sheets

(56) References Cited

U.S. PATENT DOCUMENTS

| | | | | |
|---|---|---|---|---|
| 4,169,614 A | * | 10/1979 | Ellens | B60R 22/22 280/801.1 |
| 4,611,854 A | * | 9/1986 | Pfeiffer | B60R 22/22 280/801.1 |
| 4,673,217 A | * | 6/1987 | Nishiyama | B60N 2/0715 297/468 |
| 4,676,556 A | * | 6/1987 | Yamanoi | B60R 22/26 297/216.1 |
| 4,726,617 A | * | 2/1988 | Nishimura | B60N 2/0705 296/65.13 |
| 4,915,451 A | * | 4/1990 | Forget | B60R 22/22 24/115 A |
| 5,769,456 A | * | 6/1998 | Juchem | B60R 22/023 280/808 |
| 6,588,850 B2 | * | 7/2003 | Matsuo | B60N 2/071 297/344.11 |
| 7,296,649 B2 | * | 11/2007 | Burghardt | B60R 22/023 180/268 |
| 7,823,924 B2 | * | 11/2010 | Dewey | B60R 22/1955 280/806 |
| 8,550,499 B2 | * | 10/2013 | Russell | B60R 22/022 280/801.2 |
| 8,650,721 B2 | * | 2/2014 | Ogawa | B60R 22/12 24/182 |
| 2002/0043872 A1 | * | 4/2002 | Townsend | B60R 22/03 297/473 |
| 2007/0029774 A1 | * | 2/2007 | Kuroki | B60R 22/1955 280/806 |
| 2009/0167073 A1 | * | 7/2009 | Fujieda | B60N 2/0705 297/452.18 |

FOREIGN PATENT DOCUMENTS

| | | |
|---|---|---|
| GB | 2100970 | 1/1983 |
| SU | 981048 | 12/1982 |

\* cited by examiner

SEAT BELT TWIST LINK

CROSS REFERENCE TO RELATED APPLICATIONS

This patent application is the U.S. national stage of PCT/US2015/049382 ("the '382 application"), filed on Sep. 10, 2015, which application is related to and claims priority benefits from U.S. Provisional Application Ser. No. 62/048,431 ("the '431 application"), filed on Sep. 10, 2014, entitled SEAT BELT TWIST LINK, the entire contents of each of which are incorporated herein by reference.

FIELD OF THE INVENTION

The invention relates to an anchoring link for coupling seat belts to passenger seats.

BACKGROUND

Passenger seats for vehicles such as aircraft, buses, trains, boats, vehicles, and the like are often designed to include a restraint device, such as a seat belt. The seat belt straps are often anchored to a location on the passenger seat assembly. In many cases, the anchor device that is connected to the seat belt strap is a plate with a hole through which a bolt is inserted to secure the plate to the passenger seat.

In other cases, the anchor device may be a snap hook anchor that is connected to an eye bolt or other plate having a hole therethrough that is fixedly secured to the passenger seat. Because the snap hook anchor is often oriented to be parallel to the flat surface of the strap, it may necessary for the portion of the plate that connects to the snap hook anchor to be oriented 90 degrees relative to the portion of the plate that connects to the passenger seat assembly (in cases where the plate is mounted vertically to the passenger seat assembly).

Typically, the 90 degree arrangement is achieved by bonding two plates to each other in a perpendicular arrangement, which can result in a potential failure point at the point where the two plates are joined. Furthermore, the flattened shape of the horizontally oriented plate does not typically provide any protection against tampering or inadvertent disconnection of the snap hook when subjected to abuse.

In certain cases, it may be desirable to provide a linking device that is integrally formed as a single piece construction that also is designed to provide some protection against inadvertent unhooking or tampering with the seat belt connection.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat belt connection assembly comprises a seat belt twist link integrally formed as a single piece construction having a mounting portion and a linking portion connected by a twist portion, wherein a plane of the mounting portion is positioned at approximately a right angle to a plane of the linking portion, wherein the linking portion comprises a planar section and a curled section, and a slot that extends through at least some of the planar section and the curled section, and wherein the curled section of the linking portion comprises a pronged end that extends along sides of the slot.

In some embodiments, the mounting portion bends away from the twist portion. In these embodiments, the mounting portion may bend approximately 20 degrees away from the twist portion.

The pronged end of the curled section may be configured to limit rotation of a seat belt fastener connected to the slot and/or to prevent the seat belt fastener from easily disconnecting from the slot.

In some embodiments, the slot is slightly wider than the seat belt fastener connected to the slot.

In certain embodiments, the seat belt twist link is formed from 301 stainless steel. The seat belt twist link may also be approximately 0.1 inch thick.

According to some embodiments, the mounting portion is pivotally mounted to a spreader of a passenger seat assembly. The seat belt twist link may be mounted to the spreader with the curled section facing down for right-side application. The seat belt twist link may also be mounted to the spreader with the curled section facing up for left-side application.

In some embodiments, the seat belt connection assembly further comprises a second seat belt twist link, wherein the mounting portion of one of the seat belt twist links is pivotally mounted to a spreader of a passenger seat assembly in a right-side application, and the mounting portion of another one of the seat belt twist links is pivotally mounted to the spreader in a left-side application.

DETAILED DESCRIPTION

Figure 1A:
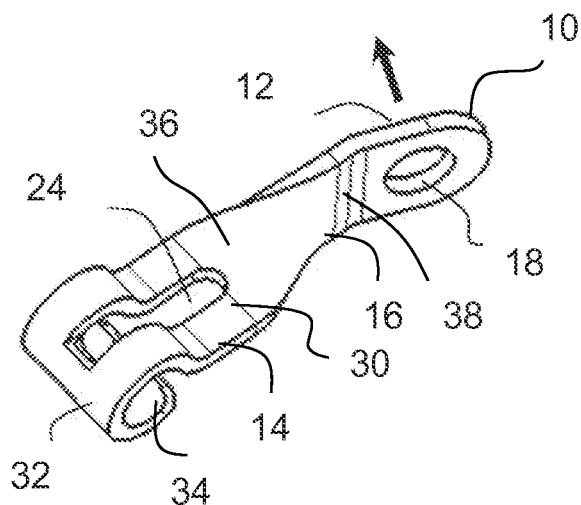
FIG. 1A is a perspective view of a seat belt twist link with the twist link in a right-side orientation, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, as best illustrated in FIGS. 1A-5, a seat belt twist link 10 comprises a mounting portion 12 and a linking portion 14 separated by a twist portion 16.

In some embodiments, the mounting portion 12 comprises a substantially planar shape with an aperture 18 that is configured for connection to a portion of a passenger seat assembly 20, such as a spreader 22.

The linking portion 14 comprises a slot 24 that is configured for connection to a snap hook 26 or other fastener of a seat belt 28. In certain embodiments, the slot 24 is arranged to extend through at least some of a planar section 30 and a curled section 32 of the linking portion 14. The slot 24 may also be configured to have a width that is slightly wider than the width of the snap hook 26.

In the curled section 32, an end 34 of linking portion 14 may wrap around and extend along sides of the slot 24. In these embodiments, the end 34 may have a pronged shape that allows the end 34 to along the sides the slot 24 without blocking access to the slot 24. When a snap hook 26 is connected to the slot 24, the snap hook 26 is also positioned between the pronged shape of the end 34. The pronged shape of the end 34 limits rotation of the snap hook 26 when the snap hook 26 contacts the end 34 at the point where the pronged shape terminates. The prongs on each side of the snap hook 26 also prevent the snap hook 26 from easily disconnecting when subjected to tampering or abuse.

An opposing end 36 of the linking portion 14 is connected to the twist portion 16, and an end 38 of the mounting portion 12 is also connected to the twist portion 16. The twist portion 16 is configured to position a plane of the mounting portion 12 at approximately a right angle to a plane of the linking portion 14. In certain embodiments, the mounting portion 12 may also slightly bend away from the twist portion 16, which allows the mounting portion 12 to rotate about the connection to the spreader 22 without interference from the linking portion 14, as well as sufficient room for easy assembly of the snap hook 26 to the linking portion 14. In certain embodiments, the mounting portion 12 bends approximately 20 degrees away from the twist portion 16.

Figure 1B:
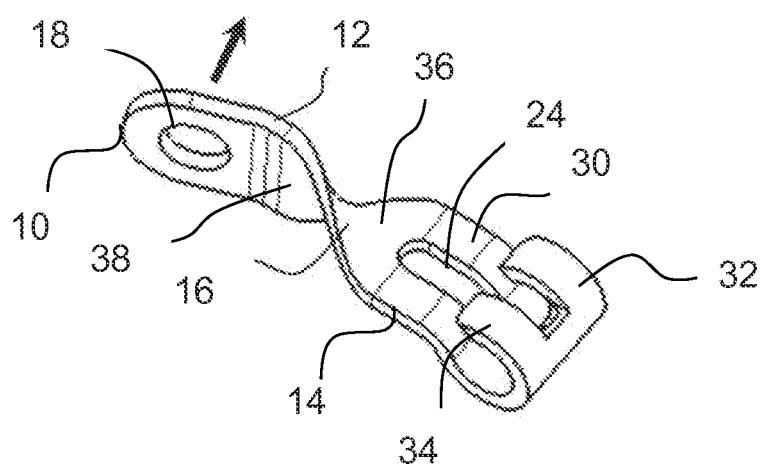
FIG. 1B is a top view of the seat belt twist link of FIG. 1A in a left-side orientation.
Figure 2:
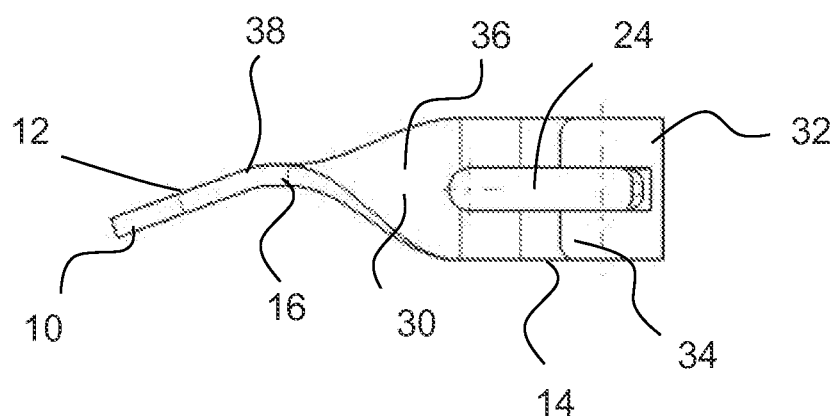
FIG. 2 is a bottom view of the seat belt twist link of FIG. 1A in the right-side orientation and a top view of the seat belt twist link of FIG. 1B in the left-side orientation.
Figure 3:
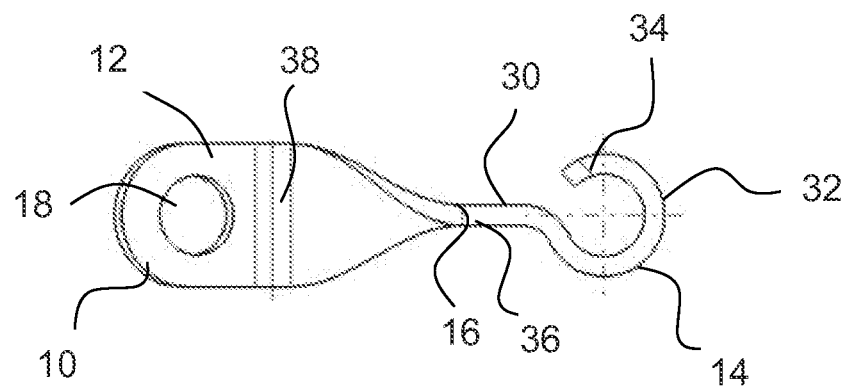
FIG. 3 is a side view of the seat belt twist link of FIGS. 1A and 1B.
Figure 4:
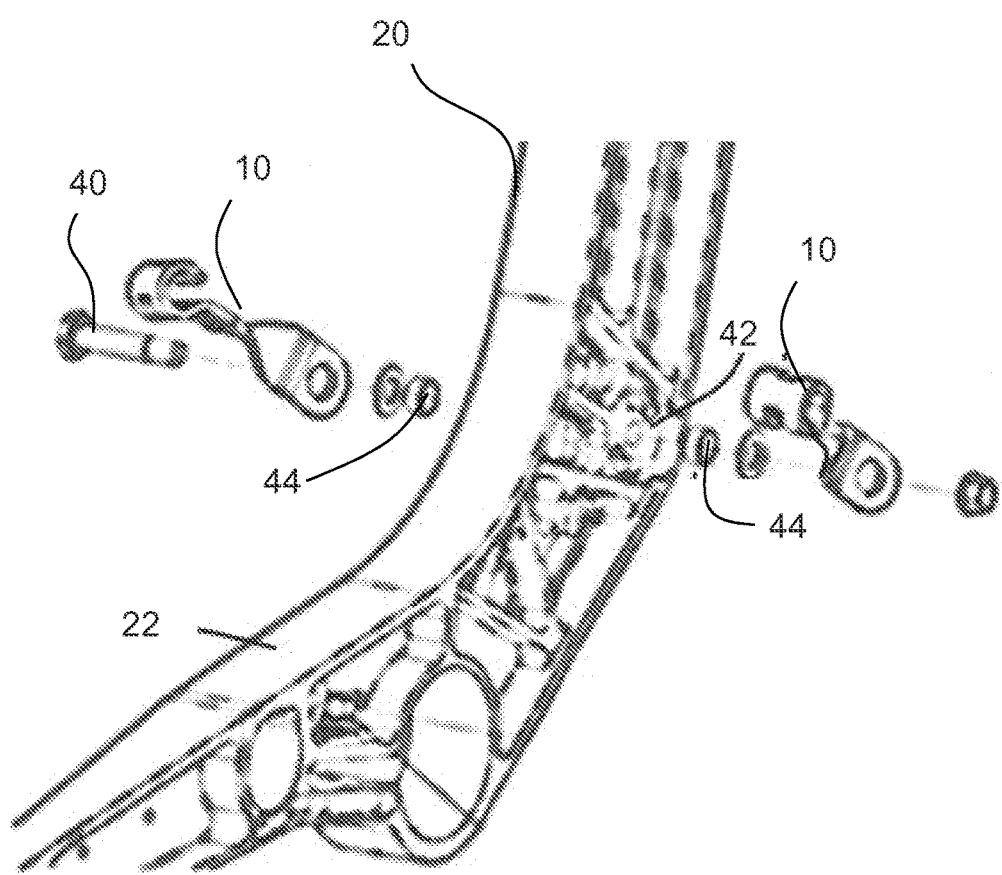
FIG. 4 an exploded perspective view of the seat belt twist link of FIG. 1B connected to a left-side spreader of a passenger seat assembly.
Figure 5:
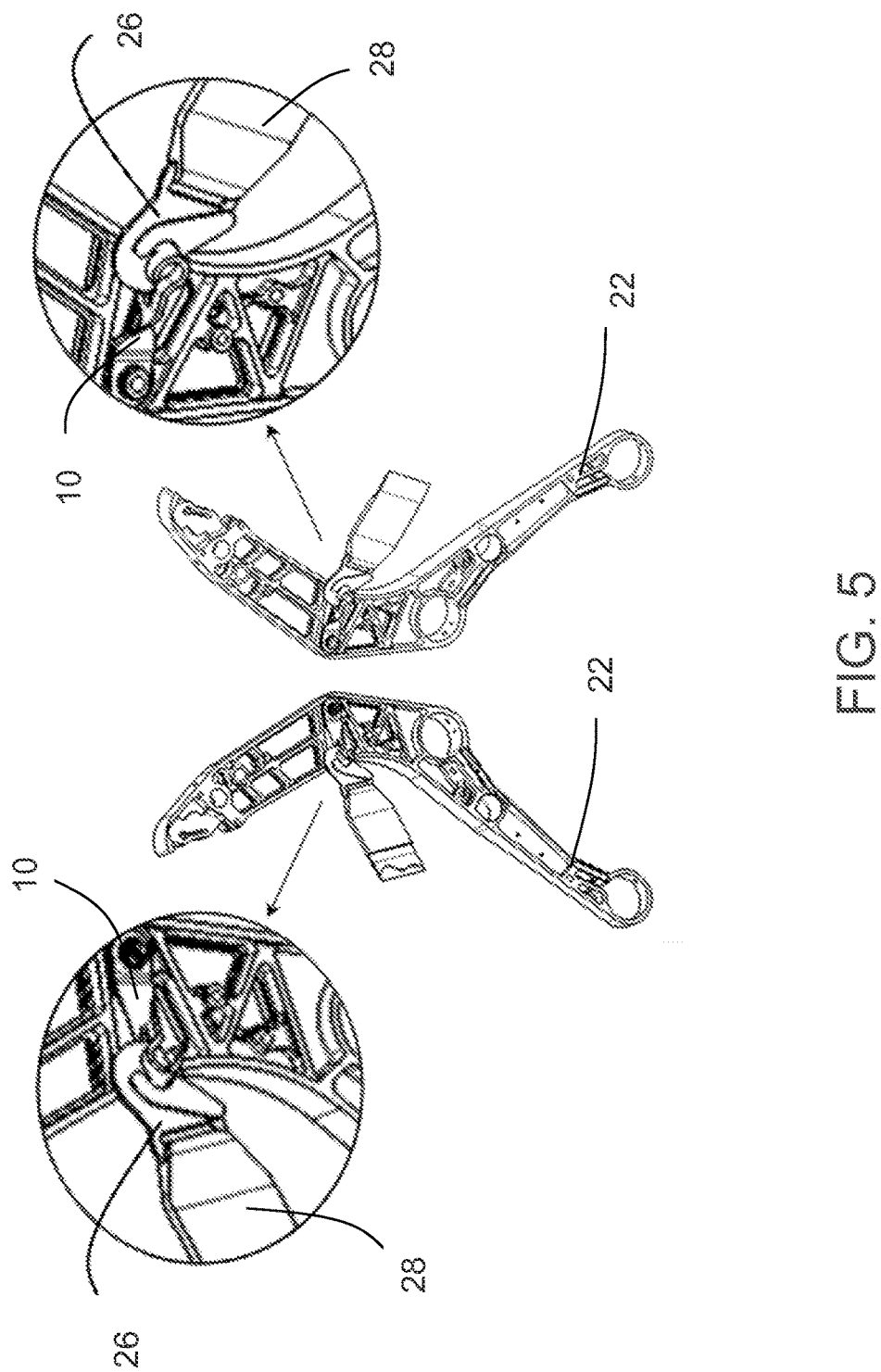
FIG. 5 is a perspective view of the seat belt twist link of FIGS. 1A and 1B connected to a right-side spreader and a left-side spreader of a passenger seat assembly.

As best illustrated in FIGS. 4-5, the mounting portion 12 is coupled to the spreader 22 via a bolt 40 that is inserted through the aperture 18 in the mounting portion 12 and a corresponding aperture 42 in the spreader 22. In the case where a spreader 22 is positioned between adjacent passenger seats, two twist links 10 may be connected to opposing sides of the spreader 22 using the same bolt 40, as shown in FIG. 4. The same twist link 10 may be used for both left-side and right-side applications. For use in a right-side application, the twist link 10 is positioned so that the curled section 32 faces down, as shown in FIG. 1A. For use in a left-side application, the twist link 10 is positioned so that the curled section 32 faces up, as shown in FIG. 1B.

In certain embodiments, a spacer 44 may be positioned between the mounting portion 12 and the spreader 22 to further facilitate the rotation of the twist link 10 around the bolt 40.

In certain embodiments, the twist link 10 is integrally formed as a single piece construction. For example, the twist link 10 may be formed from 301 stainless steel half hard sheet of 0.1 inch thickness. However, a person of ordinary skill in the relevant art will understand that the twist link 10 may be formed from any suitable material that can be twisted and bent to achieve the desired shape while also providing the required strength and stability to secure the seat belt 28 to the passenger seat assembly 20.

In certain embodiments, the overall length is approximately 2.7 inches and the width is approximately 0.7 inches. Furthermore, the aperture 18 may be slightly larger than 0.385 inches to allow the spacer 44 to pass through the aperture 18 and rotated freely.

A working example of the twist link 10 with a sheet thickness of 0.12 inches has been subjected to a pull test and found to be equivalent to the current design, which is over 3000 lbs. Reducing sheet thickness, as well as use of other variants of materials while achieving similar test results, will reduce the weight and part costs.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat belt connection assembly comprising:
   a seat belt twist link integrally formed as a single piece construction having a mounting portion and a linking portion connected by a twist portion;
   wherein a plane of the mounting portion is positioned at approximately a right angle to a plane of the linking portion;
   wherein the linking portion comprises a planar section and a curled section, and a slot that extends through at least some of the planar section and the curled section; and
   wherein the curled section of the linking portion comprises a pronged end that extends along sides of the slot.

2. The seat belt connection assembly of claim 1, wherein the mounting portion bends away from the twist portion.

3. The seat belt connection assembly of claim 1, wherein the mounting portion bends approximately 20 degrees away from the twist portion.

4. The seat belt connection assembly of claim 1, wherein the pronged end is configured to limit rotation of a seat belt fastener connected to the slot.

5. The seat belt connection assembly of claim 4, wherein the pronged end is configured to prevent the seat belt fastener from easily disconnecting from the slot.

6. The seat belt connection assembly of claim 4, wherein the slot is slightly wider than the seat belt fastener connected to the slot.

7. The seat belt connection assembly of claim 1, wherein the seat belt twist link is formed from 301 stainless steel.

8. The seat belt connection assembly of claim 1, wherein the seat belt twist link is approximately 0.1 inch thick.

9. The seat belt connection assembly of claim 1, wherein the mounting portion is pivotally mounted to a spreader of a passenger seat assembly.

10. The seat belt connection assembly of claim 9, wherein the seat belt twist link is mounted to the spreader with the curled section facing down for right-side application.

11. The seat belt connection assembly of claim 9, wherein the seat belt twist link is mounted to the spreader with the curled section facing up for left-side application.

12. The seat belt connection assembly of claim 1, further comprising a second seat belt twist link, wherein the mounting portion of one of the seat belt twist links is pivotally mounted to a spreader of a passenger seat assembly in a right-side application, and the mounting portion of another one of the seat belt twist links is pivotally mounted to the spreader in a left-side application.

* * * * *